United States Patent
Majumder (10) Patent No.: US 10,749,377 B2
(45) Date of Patent: Aug. 18, 2020

(54) DISTRIBUTED NETWORK CONTROL OF A MICROGRID

(71) Applicant: ABB Power Grids Switzerland AG, Baden (CH)

(72) Inventor: Ritwik Majumder, Västerås (SE)

(73) Assignee: ABB Power Grids Switzerland AG, Baden (CH)

( * ) Notice: Subject to any disclaimer, the term of this patent is extended or adjusted under 35 U.S.C. 154(b) by 22 days.

(21) Appl. No.: 16/308,256

(22) PCT Filed: Jun. 8, 2016

(86) PCT No.: PCT/EP2016/062954
§ 371 (c)(1),
(2) Date: Dec. 7, 2018

(87) PCT Pub. No.: WO2017/211399
PCT Pub. Date: Dec. 14, 2017

(65) Prior Publication Data
US 2019/0267838 A1    Aug. 29, 2019

(51) Int. Cl.
*H02J 13/00* (2006.01)
*G05B 15/02* (2006.01)
(Continued)

(52) U.S. Cl.
CPC .......... *H02J 13/0017* (2013.01); *G05B 15/02* (2013.01); *H02J 3/28* (2013.01);
(Continued)

(58) Field of Classification Search
CPC ........... H02J 13/0017; H02J 3/381; H02J 3/28
See application file for complete search history.

(56) References Cited

U.S. PATENT DOCUMENTS 9,712,040 B1 * 7/2017 Kim .................. H02M 1/12
2012/0101639 A1   4/2012 Carralero et al.
(Continued)

FOREIGN PATENT DOCUMENTS

| CN | 101697422 A   | 4/2010 |
| CN | 2014071314 A2 | 5/2014 |
| CN | 104467010 A   | 3/2015 |

OTHER PUBLICATIONS

Caldognetto Tommaso et al:"Experimental verification of an active microgrid with distributed power-based control", 2015 17th European Conference on Power Electronics and Applications Published Sep. 8, 2015, pp. 1-8.
(Continued)

*Primary Examiner* — Vincent H Tran
(74) *Attorney, Agent, or Firm* — Slater Matsil, LLP (57) ABSTRACT

A microgrid control system including a plurality of distributed generators, loads and/or energy storages. The system includes a microgrid controller arrangement, and a network controller arrangement. The network controller is distributed and configured to perform measurements on the microgrid, send information to at least one other of the plurality of network controllers, and send information to the microgrid controller arrangement based on the performed measurements. The information sent to the microgrid controller arrangement relates to assets which are included in a segment of the microgrid with which the controller is associated. The microgrid controller arrangement is configured to control the plurality of assets by instructing respective converter controller of each of the plurality of assets.

13 Claims, 4 Drawing Sheets

(51) Int. Cl.
*H02J 3/28* (2006.01)
*H02J 3/38* (2006.01)
*H02J 3/46* (2006.01)

(52) U.S. Cl.
CPC ............... *H02J 3/381* (2013.01); *H02J 3/46* (2013.01); *H02J 3/388* (2020.01); *Y02P 80/14* (2015.11)

(56) References Cited

U.S. PATENT DOCUMENTS

| | | | | |
|---|---|---|---|---|
| 2012/0271470 | A1* | 10/2012 | Flynn | H02J 3/383 700/292 |
| 2013/0184894 | A1 | 7/2013 | Sakuma et al. | |
| 2013/0286521 | A1* | 10/2013 | Park | H02H 3/066 361/57 |
| 2014/0249686 | A1* | 9/2014 | Brainard | H02J 3/40 700/286 |
| 2015/0295581 | A1* | 10/2015 | Shi | H02J 3/40 700/287 |
| 2016/0079752 | A1 | 3/2016 | Matan et al. | |
| 2017/0331325 | A1* | 11/2017 | Ristau | G05B 15/02 |
| 2018/0131268 | A1* | 5/2018 | Somani | H02J 3/381 |
| 2018/0173171 | A1* | 6/2018 | Lin | H02J 3/06 |

OTHER PUBLICATIONS

International Preliminary Report on Patentability Application No. PCT/EP2016/062954 Completed: Aug. 30, 2018 13 Pages.
International Search Report & Written Opinion of the International Searching Authority Application No. PCT/EP2016/062954 Completed: Feb. 22, 2017; dated Mar. 1, 2017 14 Pages.
Written Opinion of the International Preliminary Examining Authority Application No. PCT/EP2016/062954 Completed: May 7, 2018 6 Pages.

* cited by examiner

DISTRIBUTED NETWORK CONTROL OF A MICROGRID

TECHNICAL FIELD

The present disclosure relates to a microgrid control system for a power microgrid configured to be connected to a power distribution grid via at least one point of common coupling (PCC). The microgrid comprises a plurality of assets in the form of distributed generators (DG:s), loads and/or energy storages.

BACKGROUND

A microgrid is a localized grouping of electricity generation, energy storage, and loads that normally operates connected to a traditional centralized grid (power distribution grid or macrogrid) via a point of common coupling (PCC). This single point of common coupling with the macrogrid can be disconnected, islanding the microgrid. Microgrids are part of a structure aiming at producing electrical power locally from many small energy sources, Distributed Generators (DGs). In a microgrid, a DG is connected via a converter or synchronous machine which controls the output of the DG, i.e. the current injected into the microgrid.

A microgrid (in grid connected mode, i.e. connected to the macrogrid) supplies the optimized or maximum power outputs from the connected DG sites and the rest of the power is supplied by the macrogrid. The microgrid is connected to the macrogrid at a PCC through a controllable switch. This grid connection is lost during grid fault and the microgrid is islanded.

A microgrid is controlled by a controller, which may be centralized or distributed, which e.g. controls DGs in accordance with voltage or current control schemes. One of the aspects of microgrid control is efficient control of the grid interface at the PCC. Various conditions e.g. power flow, voltage, disconnection or power factor at the PCC impose different control requirement within the microgrid.

There are various methods to control the grid interface and one of them is to have a dedicated network controller. The network controller can monitor and communicate different system conditions to other controllers within the microgrid (e.g. status of the grid circuit breaker). The network controller can participate in various functions such as black start, resynchronization, planned islanding, voltage droop for the microgrid as well as power factor correction.

CN 104467010 discloses a microgrid divided into a plurality of sub-microgrids, each having a microgrid controller communicating with a main microgrid controller.

SUMMARY

In accordance with the present invention, it has been realized that it may in some cases be convenient to use a distributed network controller arrangement comprising a plurality of network controllers (herein also called N controllers). Potential benefits with using a plurality of network controllers include:

1. Size: With a larger microgrid, e.g. with high number of (distributed) microgrid controllers and geographical distances (leading to more complex communication routs) may pose challenges to a single network controller.
2. Multiple PCC: With multiple grid connections (interfaces between the microgrid and one or several other, e.g. distribution, grid(s)) there may be a need for multiple network controllers, at least one for each PCC.
3. Expansion: Expansion of the microgrid and changes in grid structure may be facilitated with the possibility to add additional network controller(s) to the microgrid.

In accordance with the present invention, the network controller arrangement may be a distributed controller configured to control and monitor the electrical interfaces with controllable switches between the microgrid and a main/distribution grid with which it is connected, or between different segments of the microgrid.

According to an aspect of the present invention, there is provided a microgrid control system for a power microgrid configured to be connected to a power distribution grid via at least one point of common coupling, the microgrid comprising a plurality of assets in the form of distributed generators, loads and/or energy storages. The control system comprises a microgrid controller arrangement, and a network controller arrangement. The network controller arrangement is distributed and comprises a plurality of network controllers 4 each being configured to perform measurements on the microgrid, send information to at least one other of the plurality of network controllers based on the performed measurements, and send information to the microgrid controller arrangement based on the performed measurements. The information sent to the microgrid controller arrangement relates to assets of the plurality of assets which are comprised in a segment of the microgrid with which segment the network controller is associated. The microgrid controller arrangement is configured to, based on the information from the plurality of network controllers, control the plurality of assets by instructing respective converter controller (also called primary controller) of each of the plurality of assets.

According to an aspect of the present invention, there is provided a microgrid comprising an embodiment of the control system of the present disclosure.

It is noted that the microgrid comprises several different types of controllers, including:

Network controllers (which are the main focus of the present disclosure), which may mainly monitor an interface of the microgrid, e.g. an interface between the microgrid and another power grid at a PCC or an interface between different segments of the microgrid, by e.g. monitoring power flow over the interface and/or galvanic connection over the interface (for instance checking whether a circuit breaker or other switch at the interface is open or closed, islanding or connecting the microgrid or segment thereof).

Microgrid controller(s) which are responsible for controlling the assets (DGs, loads etc.) of the microgrid, e.g. by maintaining control mode (e.g. power/voltage control mode), and instructing the primary/converter controller of each asset. The microgrid controller may be centralized and/or distributed where each asset may have its own microgrid controller which communicates with other microgrid controllers in the microgrid without having to go via a central microgrid or network controller.

Primary/converter controllers of each asset, which are configured for operating the converter interface of the asset in the microgrid by, based on the instructions from its associated microgrid controller, send firing pulses to switches of the converter interface.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
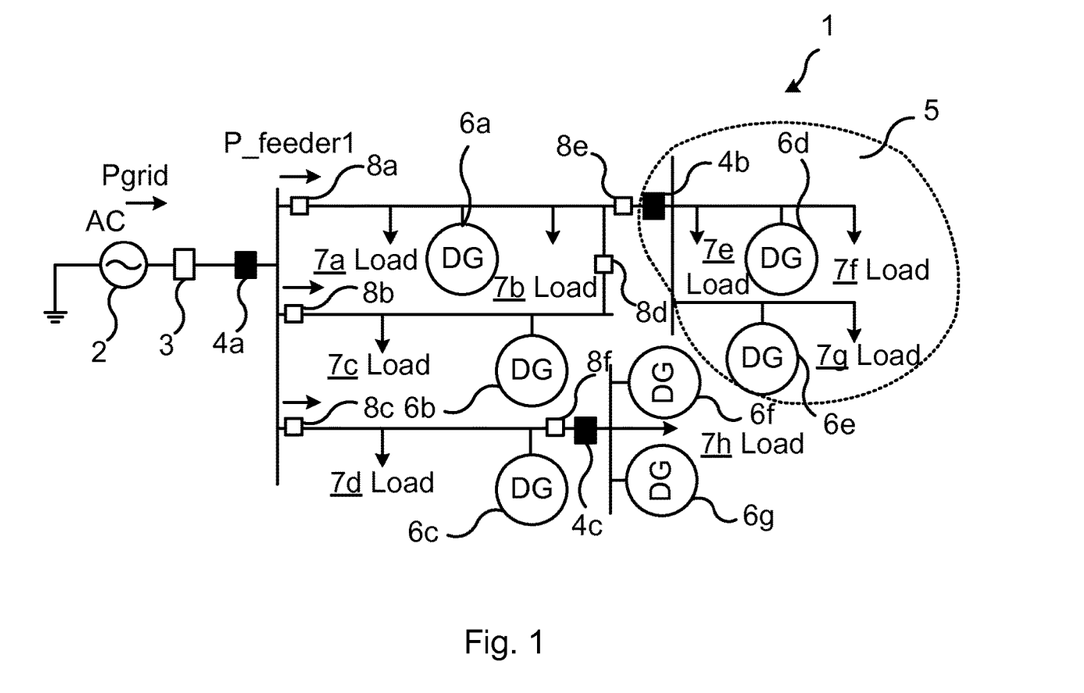
FIG. 1 is a schematic diagram of an embodiment of a microgrid, in accordance with the present invention.

FIG. 1 schematically illustrates an embodiment of a microgrid 1 of the present invention. The microgrid 1 is connected to a power distribution grid (macrogrid) 2 (typically an AC grid) via a circuit breaker or other switch 3. When the circuit breaker 3 is open, the microgrid 1 is islanded. The microgrid may comprise one or a plurality of phases. The microgrid comprises a plurality of DGs 6 and loads 7 connected therein, as well as microgrid internal switches 8. In accordance with the present invention, the microgrid comprises a plurality of distributed network (N) controllers 4, configured to perform some network control functions in the microgrid 1. In the figure, three N controllers are shown as a PCC N controller 4a, located at the PCC and i.a. monitoring the circuit breaker 3, a segment N controller 4b, located anywhere within the microgrid (but in this case not at a PCC) and responsible for performing the functions of an N controller for a part or segment of the microgrid, and a bus N controller 4c, similarly as the segment N controller 4b but for a part of the microgrid which due to its centralized topology may be called a bus.

As discussed herein, the N controllers 4 are dedicated to performing some control functions of the microgrid 1 which are related to the interface of the microgrid with the power distribution grid 2 (for the PCC N controller 4a) or the interface of a part (bus or segment) of the microgrid with another part of the microgrid (for the segment and bus N controllers 4b and 4c). The N controllers are not responsible for e.g. maintaining a control mode (e.g. current control or voltage control) of the microgrid assets such as DGs 6, loads 7 and any energy storages (not shown) of the microgrid, since such functions are performed by another type of controller, herein called microgrid controller. The microgrid controller may be centralized, but in some embodiments it is preferably distributed such that each microgrid asset (DGs 6, loads 7) comprises its own distributed microgrid controller configured for e.g. calculating power and voltage references for the asset and controlling the primary (converter) controller of the asset in line with the calculated references. The distributed microgrid controllers may communicate directly with each other, without having to communicate via a central microgrid controller or via an N controller 4.

The functions performed by the PCC N controller 4a may include performing measurements on the microgrid with the objective of any of:

monitoring the circuit breaker 3 (open or closed),
monitoring (including measuring) the power flow over the PCC,
make the power flow zero at over the PCC,
provide voltage droop reference for the PCC,
measure and communicate the frequency and voltage differentials to the microgrid controller arrangement, and
sending information about the results of the monitoring to the distributed or centralized microgrid controller(s) of its associated assets (according to the example of the figure, these assets include the DGs 6a, 6b and 6c, and the loads 7a, 7b, 7c and 7d, and possibly also the internal switches 8a, 8b and 8c). The PCC N controller may thus assign control tasks to the other N controllers 4b and 4c.

Similarly, the functions performed by the segment N controller 4b may include performing measurements on the microgrid with the objective of any of:

monitoring the switches 8e and/or 8d (open or closed),
monitoring (including measuring) the power flow over the switch 8e,
make the power flow zero at over the switch 8e,
provide voltage droop reference for the switch 8e,
measure and communicate the frequency and voltage differentials to the microgrid controller arrangement, and
sending information about the results of the monitoring to the distributed or centralized microgrid controller(s) of its associated assets (according to the example of the figure, these assets include the DGs 6d, and 6e, and the loads 7e, 7f and 7g).

Similarly, the functions performed by the bus N controller 4c may include performing measurements on the microgrid with the objective of any of:

monitoring (including measuring) the power flow to/from the bus,
make the power flow zero at over the switch 8f,
provide voltage droop reference for the switch 8f,
measure and communicate the frequency and voltage differentials to the microgrid controller arrangement, and
sending information about the results of the monitoring to the distributed or centralized microgrid controller(s) of its associated assets (according to the example of the figure, these assets include the DGs 6f, and 6g, and the load 7h).

Figure 2:
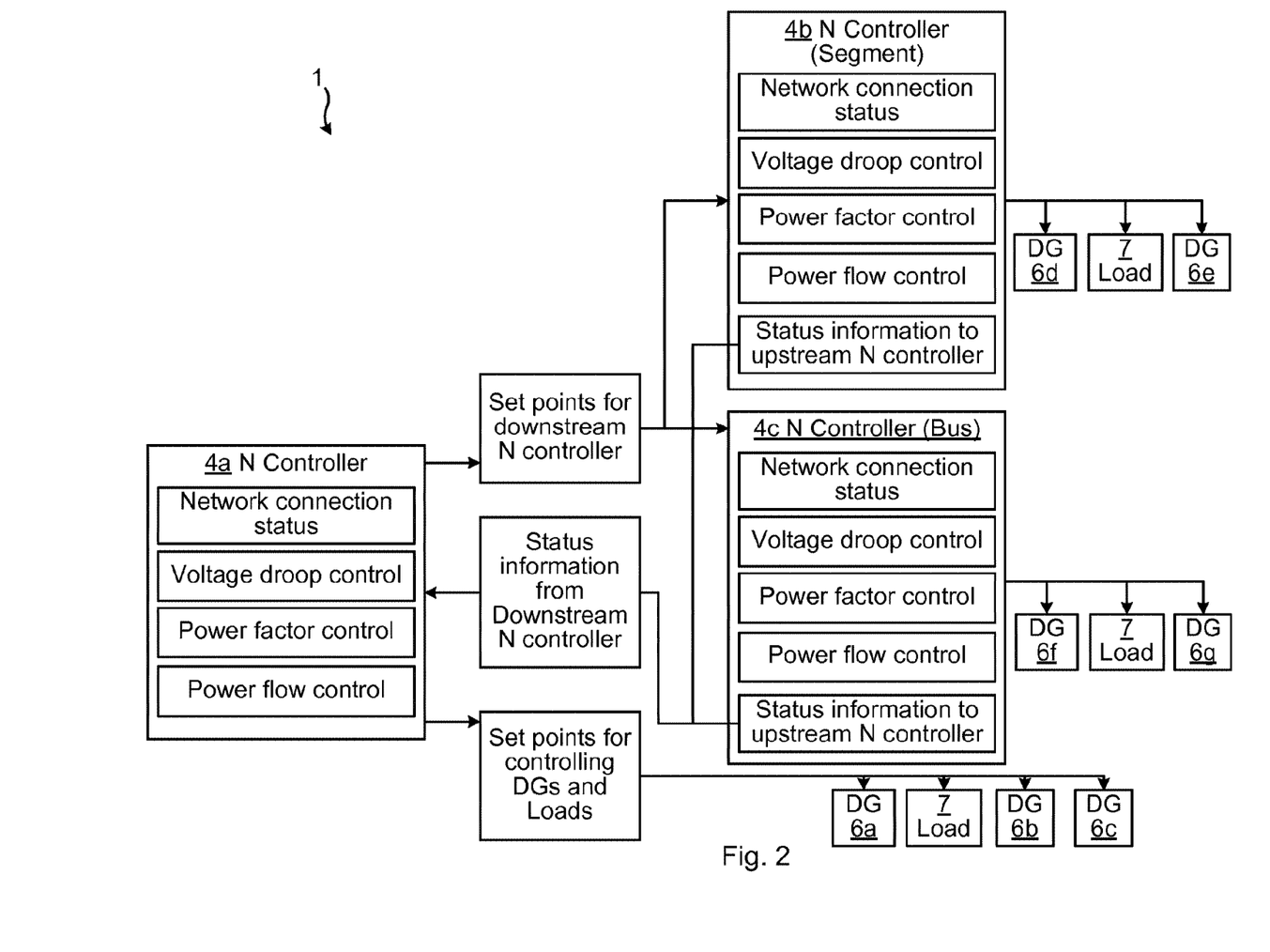
FIG. 2 is a schematic functional block diagram of an embodiment of a network controller arrangement, in accordance with the present invention.
Figure 3:
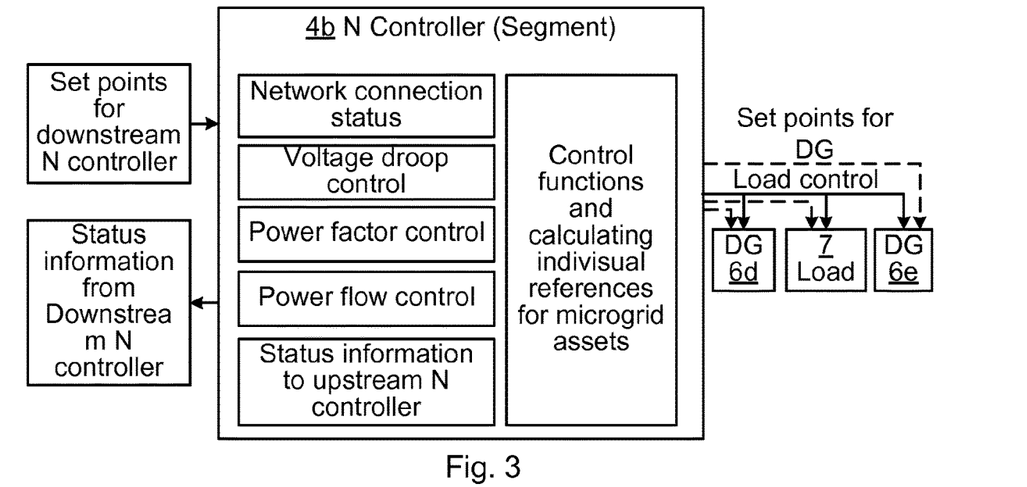
FIG. 3 is a schematic functional block diagram of an embodiment of a segment network controller, in accordance with the present invention.

FIGS. 2 and 3 illustrate how the network controller arrangement may operate. The control method may vary but the concept comprises distributed network controllers which communicate with each other. The PCC N controller 4a (at least one for a grid connected microgrid 1) may calculate and/or determine set points and/or control modes of the downstream N controllers 4b and 4c. These set points and/or control mode instructions (or other information e.g. the measured values or status of the switch 8/circuit breaker 3 as open or closed) may be communicated to the respective downstream N controller as distributed tasks. The downstream N controllers 4b and 4c then calculates individual references for each asset 6 or 7 and assign control tasks to the microgrid assets (DG 6, load 7 etc.) microgrid controller (s) to achieve the control goal. Selective information is communicated as feedback from the downstream N controllers to the upstream (PCC) N controller(s) 4a.

EXAMPLE 1

Figure 4:
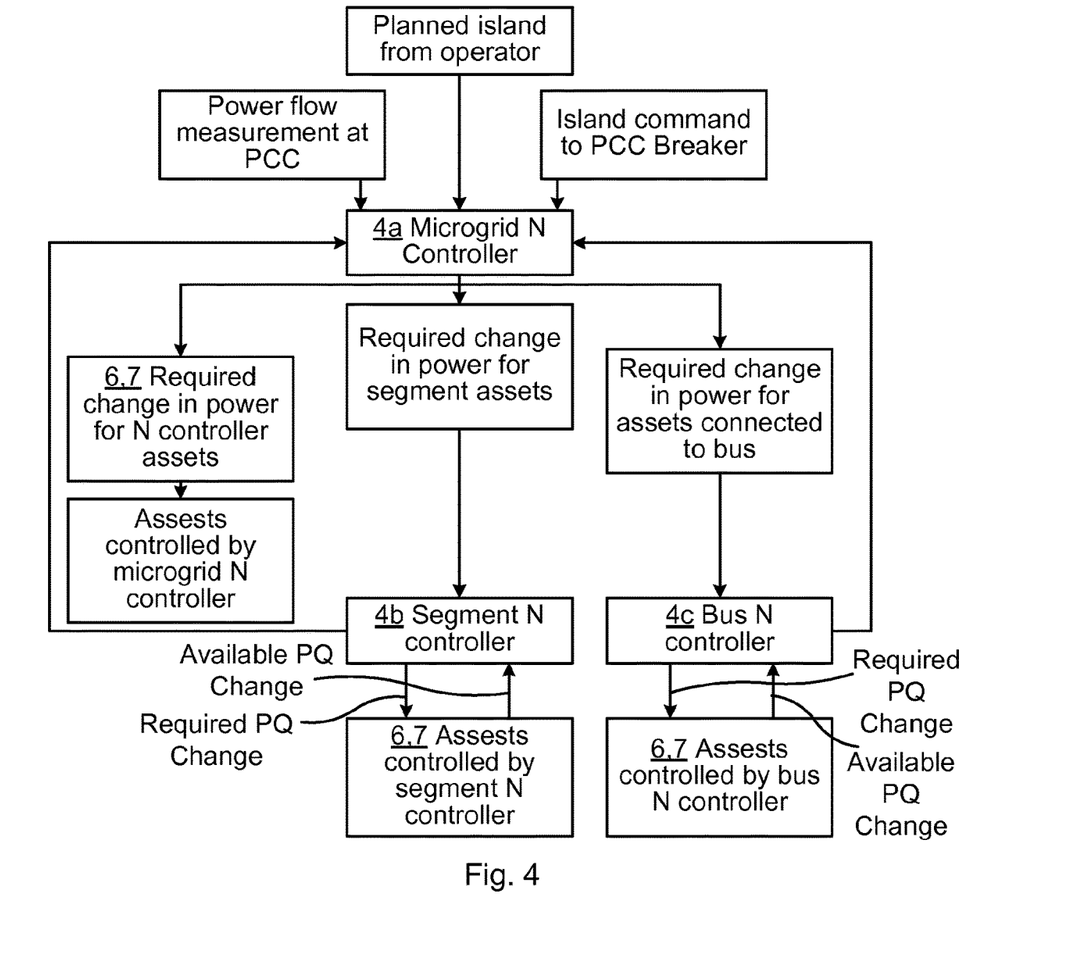
FIG. 4 is a schematic functional block diagram of an embodiment of a network controller arrangement, in accordance with the present invention.

One example for bump-less planned islanding with distributed N controller arrangement is illustrated in FIG. 4. Similarly, all the functions of a network controller (e.g. black start, spinning reserve, voltage droop, power factor correction etc.) can be implemented by means of distributed N controllers 4 in accordance with the present invention.

As can be seen in FIG. 4, the required change in power flow at PCC 3 is distributed among the N controllers 4a, 4b and 4c for controlling the microgrid assets (DG 6, load 7 etc.). P stands for active power, while Q stands for the reactive power. Each network controller 4 sends instructions about required P and Q change to the respective distributed microgrid controller of each asset in the segment 5 with which the network controller is associated. The microgrid controllers may in response thereto feedback information about available (possible or performed) P and Q change.

Below follow some examples regarding challenges and high level solution approaches with embodiments of the present invention.

EXAMPLE 2

Size

A large size microgrid 1 with geographically dispersed assets 6 and 7 may benefit from use of distributed network controllers to handle increased amount of control signalling, segmentation etc. As discussed herein, the network controllers are coordinated by means of internal communication, e.g. sending information or instructions upstream and downstream.

EXAMPLE 3

Expansion

With expansion and use of multiple network controllers 4, any hierarchical relationship between different network controllers may be determined by their respective location in the microgrid 1. For instance the network controller 4a at the currently grid connected PCC interface may act as master (upstream) controller to the other (slave or downstream) network controllers 4b and 4c. If the microgrid has several PCC:s, which network controller 4 is master may be determined dynamically such that the PCC N controller at a PCC which is currently grid connected is master (see also Example 4).

EXAMPLE 4

Multiple Grid Connections, PCC

Figure 5:
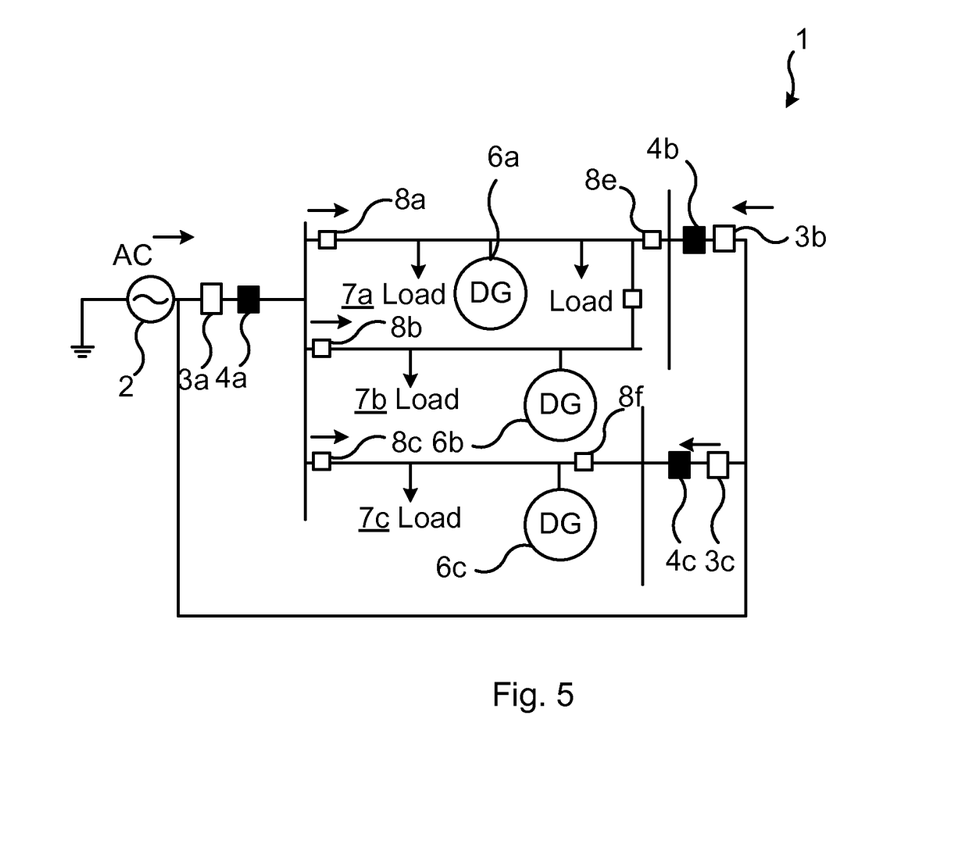
FIG. 5 is a schematic diagram of an embodiment of a microgrid having a plurality of PCCs, in accordance with the present invention.

Multiple grid connection, as exemplified in FIG. 5, may result in system operation issues such as power flow control, impact of grid loss, stability etc. One solution is to use of microgrid assets 6 and 7 to control the power flow at PCC 3 while another option is to have a dedicated converter to do this. Grid loss in multiple grid connection scenarios may be handled with temporary overloading in the other grid connection. The microgrid controller's feedback gains may be rescheduled based on grid connections for optimal performance without crossing the stability margin. However the overall microgrid operation, control and stability may be checked as the multiple grid connections change the aspect of power system operation and control within a microgrid.

However it is noted that there is an inherent problem with multiple grid connections (i.e. PCCs) to a microgrid 1, and that is that although the total power sourced/sunk by the microgrid may be controllable by the assets 6 and 7 within the microgrid, the power flow through the microgrid is controlled by the power distribution grid 2 external to the microgrid. Thus, the network controller 4a at a first PCC 3a may be striving for less power flow into the microgrid 1, but this may cause an increase in power flow at a second PCC 3b. This may be unavoidable unless a power flow controller is used at all PCCs 3a, 3b and 3c, possibly except one. Some of the techniques mentioned in previous paragraph can work with limited performance.

Advantages with multiple PCCs 3 in combination with distributed network controllers 4, as exemplified in FIG. 5, may include:

Allows scalability: Scalability in terms of PCC 3 of the microgrid 1.

Reduced communications between controllers: Communication between the microgrid controllers of assets 6 & 7 and network controllers 4 for various microgrid functions.

Allows multiple network connections (PCC): This may improve grid connection reliability.

Increased power flow to/from microgrid 1 to/from distribution grid 2 through the use of multiple connections: This may avoid exceeding the grid power limit of a single PCC 3.

EMBODIMENTS

Below follow some embodiments of the present invention, which may be preferred depending on circumstances.

In some embodiments, the microgrid controller arrangement is distributed and comprises a plurality of microgrid controllers each being associated with a respective asset 6 or 7 of the plurality of assets. Each asset may comprise its own microgrid controller. Each of the plurality of microgrid controllers may in some embodiments be configured for communication with other microgrid controllers of the plurality of microgrid controllers, e.g. directly and not via a central controller.

In some embodiments, each of the plurality of network controllers 4 is configured to perform the measurements in the microgrid 1 at an interface to the segment 5 with which the network controller is associated. This interface may e.g. be a PCC 3, if the network controller is a PCC network controller 4a, or a microgrid internal interface between different segments (including busses) 5 of the microgrid.

In some embodiments, at least one of the plurality of network controllers 4 is configured to perform the measurements at one of the at least one PCC 3. This PCC network controller 4a may act as a master which is configured to send instructions to at least one other of the plurality of network controllers 4b and/or 4c.

A PCC network controller 4a may be configured to, based on its performed measurements (e.g. on a circuit breaker of the PCC 3), determine whether the microgrid 1 is islanded.

In some embodiments, the microgrid comprises a plurality of PCC:s 3a, 3b and 3c and at least one respective network controller 4 of the plurality of network controllers is configured to perform the measurements at each respective PCC of the plurality of PCCs. There may thus be a one-to-one relationship between a PCC 3 and a network controller 4 associated therewith.

In some embodiments, the measurements performed by each network controller 4 comprise any or all of measurements on a switch 3 or 8 at an interface to the segment 5, power flow at an interface to the segment 5, and voltage at an interface to the segment 5.

In some embodiments, each network controller 4 is configured to, based on its performed measurements and the information from other network controller(s) of the plurality of network controllers, calculate set points for the plurality of assets 6 and 7 comprised in the segment 5, and include said set-points in the information sent to the microgrid controller arrangement, e.g. to the respective distributed microgrid controllers of said assets. Alternatively, the network controller 4 may communicate information (e.g. total required power) to the network controllers, based on which information the network controllers may calculate their own set points.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A microgrid control system for a power microgrid configured to be connected to a power distribution grid via at least one point of common coupling, PCC, the microgrid comprising a plurality of assets in the form of distributed generators, DGs, loads and/or energy storages, the control system comprising:
    a microgrid controller arrangement; and
    a network controller arrangement;
    wherein the network controller arrangement is distributed and comprises a plurality of network controllers each being configured to:
    be associated with an interface to a segment of the microgrid and perform measurements on the microgrid, including measuring a power flow over the interface,
    send information to at least one other of the plurality of network controllers based on the performed measurements, and
    send information to the microgrid controller arrangement based on the performed measurements, including frequency and voltage differentials, the information relating to assets of the plurality of assets which are comprised in the segment of the microgrid with which segment the network controller is associated;
    wherein the microgrid controller arrangement is configured to, based on the information from the plurality of network controllers, calculate power and voltage references for each of the plurality of assets and control the plurality of assets by instructing respective converter controller of each of the plurality of assets.

2. The control system of claim 1, wherein the microgrid controller arrangement is distributed and includes a plurality of microgrid controllers each being associated with a respective asset of the plurality of assets.

3. The control system of claim 2, wherein each of the plurality of microgrid controllers is configured for communication with other microgrid controllers of the plurality of microgrid controllers.

4. The control system of claim 2, wherein at least one of the plurality of network controllers is configured to perform the measurements at one of the at least one PCC.

5. The control system of claim 2, wherein the measurements further include any of:
    measurements on a switch at the interface to the segment; and
    voltage at an interface to the segment.

6. The control system of claim 1, wherein at least one of the plurality of network controllers is configured to perform the measurements at one of the at least one PCC.

7. The control system of claim 6, wherein the at least one network controller is a master network controller and is configured to send instructions to at least one other of the plurality of network controllers.

8. The control system of claim 7, wherein the at least one network controller is configured to, based on its performed measurements, determine whether the microgrid is islanded.

9. The control system of claim 7, wherein the at least one PCC includes a plurality of PCCs, and wherein at least one respective network controller of the plurality of network controllers is configured to perform the measurements at each respective PCC of the plurality of PCCs.

10. The control system of claim 6, wherein the at least one network controller is configured to, based on its performed measurements, determine whether the microgrid is islanded.

11. The control system of claim 6, wherein the at least one PCC includes a plurality of PCCs, and wherein at least one respective network controller of the plurality of network controllers is configured to perform the measurements at each respective PCC of the plurality of PCCs.

12. The control system of claim 1, wherein the measurements further include any of:
    measurements on a switch at the interface to the segment; and
    voltage at an interface to the segment.

13. A microgrid comprising the control system configured to be connected to a power distribution grid via at least one point of common coupling, PCC, the microgrid comprising a plurality of assets in the form of distributed generators, DGs, loads and/or energy storages, the control system comprising:
    a microgrid controller arrangement; and
    a network controller arrangement;
    wherein the network controller arrangement is distributed and comprises a plurality of network controllers each being configured to:
    be associated with an interface to a segment of the microgrid and perform measurements on the microgrid, including measuring a power flow over the interface,
    send information to at least one other of the plurality of network controllers based on the performed measurements, and
    send information to the microgrid controller arrangement based on the performed measurements, including frequency and voltage differentials, the information relating to assets of the plurality of assets which are comprised in the segment of the microgrid with which segment the network controller is associated;

wherein the microgrid controller arrangement is configured to, based on the information from the plurality of network controllers, calculate power and voltage references for each of the plurality of assets and control the plurality of assets by instructing respective converter controller of each of the plurality of assets.

* * * * *